(No Model.)

E. A. SPERRY.
CAR WHEEL.

No. 534,976. Patented Feb. 26, 1895.

Witnesses.
L. B. Abell
John B. Linn

Inventor.
Elmer A. Sperry.

UNITED STATES PATENT OFFICE.

ELMER A. SPERRY, OF CLEVELAND, OHIO, ASSIGNOR TO THE SPERRY ELECTRIC RAILWAY COMPANY, OF OHIO.

CAR-WHEEL.

SPECIFICATION forming part of Letters Patent No. 534,976, dated February 26, 1895.

Application filed June 6, 1894. Serial No. 513,635. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Car-Wheels, of which the following is a specification.

My invention relates to vehicle wheels, and consists in a form and construction which has been found practicable to cast from such material as is necessarily used in wheels of this class on account of chilling, shrinkage, cracking, &c., as is well known in the art.

Figure 1:
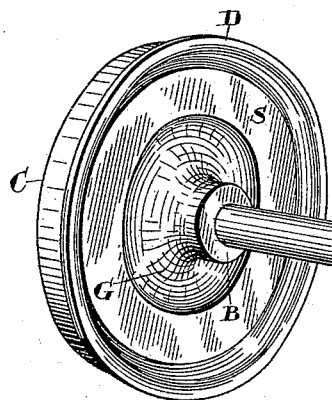
Figure 1:
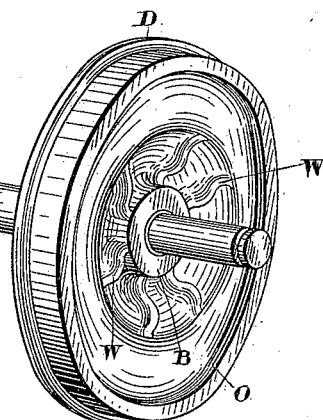
Figure 2:
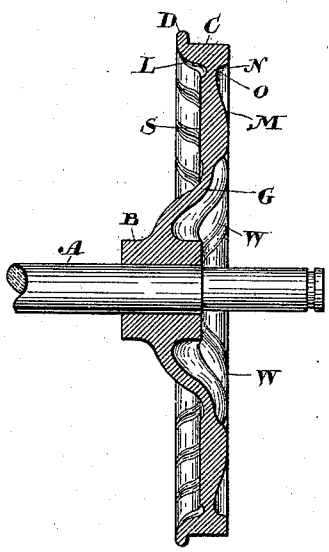

Figure 1 shows an axle with two of the wheels mounted upon it. Fig. 2 shows a sectional view of the wheel itself.

Like letters of reference indicate the same parts throughout.

A is an axle upon which rests the hub B supporting the tread C and flange D. The brake surface S is backed up by a mass of metal M for the purpose of obtaining a sufficient quantity of iron for the necessary magnetic flux and for other purposes such as proper strength, &c. This mass, though thicker at the bottom and thinner at the outer edge owing to the different peripheral lengths at these points, is still found heavy enough to draw the chill on the tread, and in casting such wheels many have been spoiled and rendered useless. I have found, however, that by making a certain inner contour, swinging the line inward and in some instances under the tread, making an undercut shown at point L, and also on the other side which is also, for some purposes, necessary as at O, I am enabled to cast the wheels with the proper density of chill on the tread C and make same durable. In some cases I have found it necessary to bring the inner and outer surfaces near enough together to form a neck at point N thinner than the mass M.

A number of designs have been made for connecting the mass M with the hub B, but I prefer the curved portion shown at G which is usually thicker than the mass M.

The wheels may be made with perforations through the mass, spokes, or without, and I find it in some cases preferable to provide the laterally projecting webs W.

It will be readily understood from the foregoing that the contour, masses and thickness of certain portions of the web are so related that, first, the chill is not affected by the absorption of the great mass of heat under the surface M being cut off by the smaller section or neck at O. At the same time, the difference in shrinkage between the web at G and that of the larger masses of metal exterior and interior thereto is not allowed to crack this section of the plate or web, inasmuch as the difference in cooling is made up by certain changes and relief of internal strains found to result from the peculiar contour of the web G, one form of this contour being shown in the drawings.

Having fully described my invention, what I claim as new, and desire to secure by Letters Patent, is—

1. In a wheel for a vehicle, a hub, a chilled tread, a lateral face with a certain thickness of metal backing same disposed between the tread and hub forming a portion of the web of the wheel, and a contracted portion less in thickness exterior thereto and between the face and the tread.

2. In a wheel for a vehicle, a hub, a chilled tread, a lateral face with a certain thickness of metal backing same disposed between the tread and hub forming a portion of the web of the wheel, and a contracted portion less in thickness both exterior and interior thereto and between the face and the hub and the face and the tread.

3. In a wheel for a vehicle, a hub, a chilled tread, a lateral face with a certain thickness of metal backing same disposed between the tread and hub forming a portion of the web of the wheel, and a portion curved as to section interior thereto and between the face and the hub.

ELMER A. SPERRY.

Witnesses:
FREDK. CHEETHAM,
M. NIELSON.